(12) United States Patent
Machishima et al.

(10) Patent No.: US 8,115,826 B2
(45) Date of Patent: Feb. 14, 2012

(54) IMAGE PROCESSING APPARATUS, IMAGING APPARATUS, METHOD AND PROGRAM

(75) Inventors: Eiji Machishima, Kanagawa (JP); Takayuki Okuno, Kanagawa (JP); Takahiro Kaneda, Chiba (JP)

(73) Assignee: Sony Corporation, Tokyo (JP)

( * ) Notice: Subject to any disclaimer, the term of this patent is extended or adjusted under 35 U.S.C. 154(b) by 510 days.

(21) Appl. No.: 12/351,003

(22) Filed: Jan. 9, 2009

(65) Prior Publication Data

US 2009/0180001 A1    Jul. 16, 2009

(30) Foreign Application Priority Data

Jan. 11, 2008   (JP) ................. P2008-004972

(51) Int. Cl.
*H04N 5/235* (2006.01)
*H04N 9/73* (2006.01)
*G06K 9/00* (2006.01)
(52) U.S. Cl. .................. 348/223.1; 348/221.1; 382/162; 382/167
(58) Field of Classification Search .............. 348/221.1, 348/223.1, 222.1, 234–235, 273, 649, 659, 348/687, 703; 382/162, 167, 254, 274
See application file for complete search history.

(56) References Cited

U.S. PATENT DOCUMENTS

| | | | | |
|---|---|---|---|---|
| 6,480,300 B1 * | 11/2002 | Aoyama | ................. | 358/1.9 |
| 6,664,973 B1 * | 12/2003 | Iwamoto et al. | ............. | 345/589 |
| 6,819,355 B1 * | 11/2004 | Niikawa | ................. | 348/207.11 |
| 6,836,565 B1 * | 12/2004 | Nishikawa | ................. | 382/167 |
| 6,917,382 B1 * | 7/2005 | Ikeda | ................. | 348/254 |
| 7,081,918 B2 * | 7/2006 | Takemoto | ................. | 348/223.1 |
| 7,333,136 B2 * | 2/2008 | Takemoto | ................. | 348/222.1 |
| 7,551,794 B2 * | 6/2009 | Masuno et al. | ................. | 382/264 |
| 7,570,390 B2 * | 8/2009 | Mitsunaga | ................. | 358/1.9 |
| 2002/0008762 A1 * | 1/2002 | Takemoto | ................. | 348/223 |
| 2005/0120055 A1 * | 6/2005 | Kawaguchi | ................. | 707/104.1 |
| 2005/0180629 A1 * | 8/2005 | Masuno et al. | ................. | 382/169 |
| 2005/0195291 A1 * | 9/2005 | Kubo | ................. | 348/229.1 |

FOREIGN PATENT DOCUMENTS

| | | |
|---|---|---|
| JP | 2001 189890 | 7/2001 |
| JP | 2001 359114 | 12/2001 |
| JP | 2003 69846 | 3/2003 |
| JP | 2003 224769 | 8/2003 |
| JP | 2004 23401 | 1/2004 |
| JP | 2004 312467 | 11/2004 |
| JP | 2005 117524 | 4/2005 |
| JP | 2007 49540 | 2/2007 |
| JP | 2007 96582 | 4/2007 |

* cited by examiner

*Primary Examiner* — Nhan T Tran
*Assistant Examiner* — Tuan Le
(74) *Attorney, Agent, or Firm* — Frommer Lawrence & Haug LLP; William S. Frommer

(57) ABSTRACT

An image processing apparatus includes a tone conversion section configured to execute luminance tone compression on an entered image by use of a predetermined conversion curve; a linear matrix processing block configured to execute correction based on matrix operation on an image entered via the tone conversion section; and a hue and saturation adjustment block configured to execute hue and saturation conversion processing based on a set parameter on an image entered via the linear matrix processing block. The apparatus further includes a brightness decision block configured to determine whether brightness of the image to be processed is lower than a certain brightness level; and a control block configured to control a combination of the operations to be processed by the processing section and blocks on the basis of setting of a tone conversion function of the tone conversion section and a decision result obtained by the brightness decision block.

12 Claims, 8 Drawing Sheets

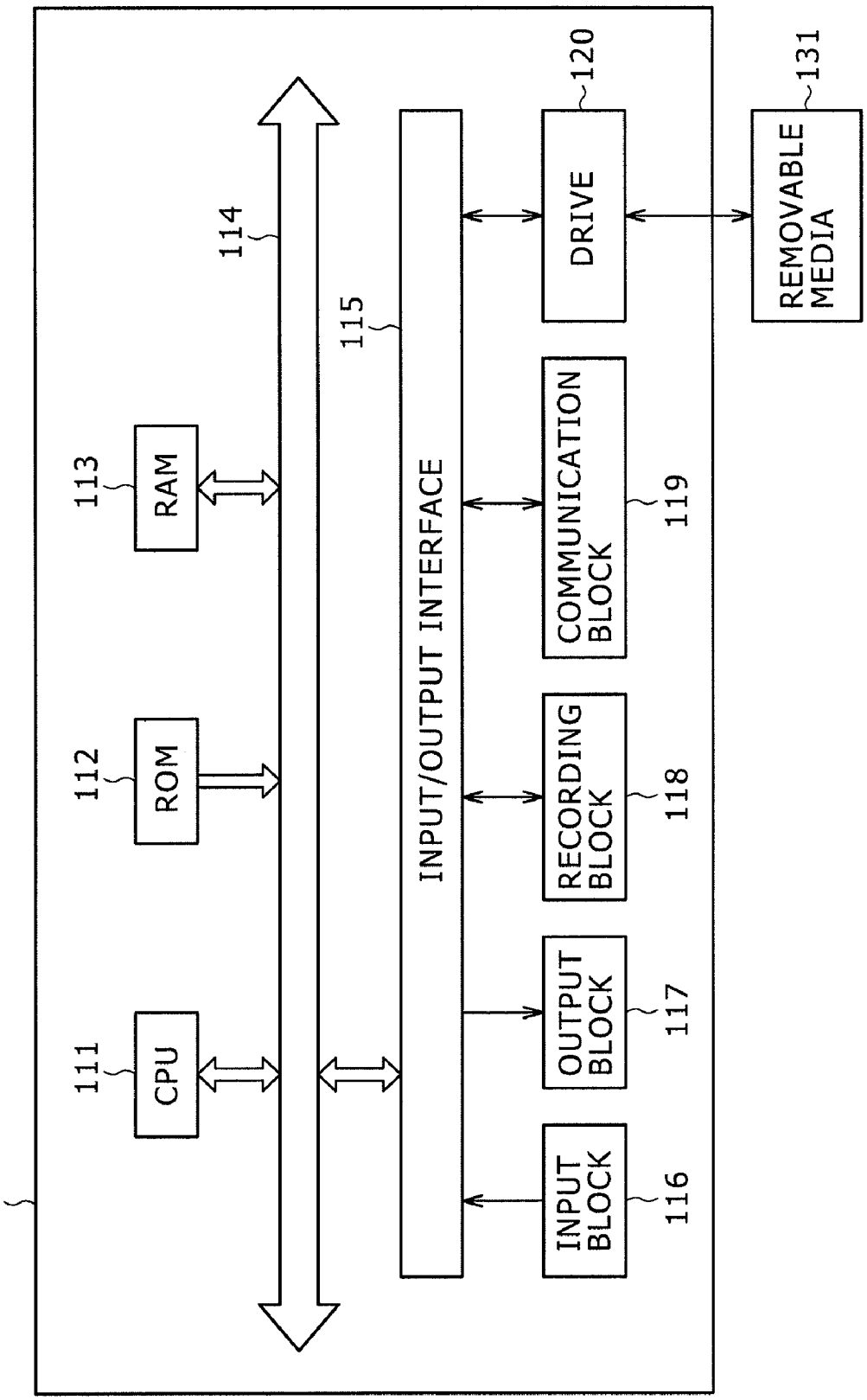

IMAGE PROCESSING APPARATUS, IMAGING APPARATUS, METHOD AND PROGRAM

CROSS REFERENCES TO RELATED APPLICATIONS

The present invention contains subject matter related to Japanese Patent Application JP 2008-004972 filed in the Japan Patent Office on Jan. 11, 2008, the entire contents of which being incorporated herein by reference.

BACKGROUND OF THE INVENTION

1. Field of the Invention

The present invention relates to an image processing apparatus, an imaging apparatus, an imaging method, and a program and, more particularly, to an image processing apparatus, an imaging apparatus, an imaging method, and a program that are suitably used for executing tone correction processing on tone-compressed images.

2. Description of the Related Art

Recently, the enhancement in the performance of image sensors has widened the dynamic range of images that can be taken by video cameras. However, the dynamic range displayable by display apparatuses may be narrower than the dynamic range of images taken by video cameras compliant with the recent wide dynamic range. If this happens, the dynamic range of images has to be converted into narrower one. For one of conversion technologies, so-called tone compression technology for converting the luminance of input images by use of tone curve is known (refer to Japanese Patent Laid-open No. 2007-049540, hereinafter referred to as Patent Document 1, for example).

The above-mentioned technology allows those display apparatuses which cannot display all color tones for example to convert images of wide dynamic ranges while minimizing the lowering of image contrast.

Further, for technologies for enhancing color reproducibility by correcting the spectral sensitivity of the imaging device, so-called linear matrix processing is known by which the correction processing based on linear matrix is executed on each color output.

Linear matrix processing is a technology widely used in image signal processing. If this technology is combined with the tone compression technology, luminance inversion may occur in a low luminance section and a high luminance section in an image having a high luminance subject high in red or blue color purity such as an artificial light source including a neon light in a low luminance subject such as a night view, thereby making this image extremely unnatural.

Referring to FIG. 1, there is shown an example of a night view image in which high-rise buildings stand. As shown in FIG. 1, a night view image 1 having a high-rise building 3 also has a high luminance light source of almost monochromatic such as an airway beacon 4 within a wide low luminance section such as a night sky 2. Table 1 shows the luminance values of red component (R), green component (G), and blue component (B) and the luminance values (Y) of the entire image indicated by 10-bit tones for the low luminance section (the night sky 2) and the high luminance section (the airway beacon 4) of this night view image 1.

TABLE 1

| Subject | R | G | B | Y |
|---|---|---|---|---|
| High luminance (light source, etc.) | 840 | 240 | 200 | 415 |
| Low luminance (night sky, etc.) | 160 | 160 | 160 | 160 |

As shown in Table 1, the low luminance section is achromatic, so that R, G, B take the same value (160), while the high luminance section is chromatic (red in this example), so that R (840) is greater than G (240) and B (200). However, G and B of the high luminance section are higher than G and B of the low luminance section, so that the luminance of the night view image 1 is higher in the high luminance section than in the low luminance section.

Referring to FIG. 2, there is shown a graph indicative of an example of a tone curve, in which the horizontal axis is indicative of input tone values and the vertical axis is indicative of output tone values. Table 2 shows the tone values (or output tone values) of the luminance values of R, G, B of the high luminance section and the low luminance section and the luminance values (Y) of an entire image in the image with the dynamic range (or input tone values) of the image compressed into an 8-bit tone by use of the tone curve shown in FIG. 2 for example for the night view image 1 mentioned above.

TABLE 2

| Subject | R | G | B | Y |
|---|---|---|---|---|
| High luminance (light source, etc.) | 230 | 130 | 125 | 159 |
| Low luminance (night sky, etc.) | 120 | 120 | 120 | 120 |

The tone curve shown in FIG. 2 is a curve for compressing the one of mainly the high luminance side. If tone compression is done with such a tone curve, the luminance difference between the high luminance section (R=230, G=130, B=125) and the low luminance section (R=120, G=120, B=120) gets relatively small. However, because the tone curve always has a positive inclination at any positions along the input axis, no inversion will take place in the luminance values of the high luminance section and the low luminance section.

SUMMARY OF THE INVENTION

Table 3 shows the luminance values of R, G, B and the luminance value (Y) of an entire image obtained by executing linear matrix processing on the image that was tone-compressed as above, indicated in an 8-bit tone.

TABLE 3

| Subject | R | G | B | Y |
|---|---|---|---|---|
| High luminance (light source, etc.) | 255 | 30 | 25 | 97 |
| Low luminance (night sky, etc.) | 120 | 120 | 120 | 120 |

In the so-called linear matrix processing, it is generally practiced that operation parameters are set such that color purity is increased with chromatic color and no change occurs with achromatic colors. If linear matrix processing is executed on a tone-compressed image by use of such operation parameters, the low luminance section with R, G, B being nearly the same luminance value (=120) changes little; however, the luminance value (=255) of R is still high and the luminance values (=30, 25) of G, B are low in the high luminance section in which the luminance value of R is high. The contribution ratios of luminance values are G>R>B; especially, G has a contribution ratio of 60%, so that, as a result, the luminance value of the high luminance section gets low after linear matrix processing, getting lower than the luminance value of the low luminance section that is achromatic.

In a normal state, no luminance inversion occurs between the low luminance section and the high luminance section; however, if both tone compression processing and linear matrix processing are executed as described above, a luminance inversion may take place between the low luminance section and the high luminance section. In such a case, the high luminance section having a light source (such as the airway beacon 4) is lower in luminance value than the low luminance section of the night sky 2, so that, if the human being sees such a luminance-inverted image, the image looks extremely unnatural.

The above-pointed problem will not take place if no linear matrix processing is executed after tone compression processing. In this case, however, another problem is caused that the color reproducibility of image is lowered to degrade the picture quality.

Therefore, the present invention addresses the above-identified and other problems associated with related-art methods and apparatuses and solves the addressed problems by maintaining color reproducibility if tone compression processing is executed on an image in which a high luminance subject having high color purity exists in a low luminance subject.

In carrying out the invention and according to one embodiment thereof, there is provided an image processing apparatus. This image processing apparatus has a tone conversion section configured to execute luminance tone compression on an entered image by use of a predetermined conversion curve; a linear matrix processing block configured to execute correction based on matrix operation on an image entered via the tone conversion section; a hue and saturation adjustment block configured to execute hue and saturation conversion processing based on a set parameter on an image entered via the linear matrix processing block; a brightness decision block configured to determine whether brightness of the image to be processed is lower than a certain brightness level; and a control block configured to control a combination of the operations to be processed by the processing section and blocks on the basis of setting of a tone conversion function of the tone conversion section and a decision result obtained by the brightness decision block.

In carrying out the invention and according to another embodiment thereof, there is provided an imaging apparatus. This imaging apparatus has an imaging block configured to take a picture of a subject to generate an image; a tone conversion section configured to execute luminance tone compression on the image generated by said imaging block by use of a predetermined conversion curve; a linear matrix processing block configured to execute correction based on matrix operation on an image entered via said tone conversion section; a hue and saturation adjustment block configured to execute hue and saturation conversion processing based on a set parameter on an image entered via said linear matrix processing block; a brightness decision block configured to determine whether brightness of the image to be processed is lower than a certain brightness level; and a control block configured to control a combination of the operations to be processed by the processing section and blocks on the basis of setting of a tone conversion function of said tone conversion section and a decision result obtained by said brightness decision block.

In carrying out the invention and according to still another embodiment thereof, there are provided an image processing method and a program that are executed by an image processing apparatus having a tone conversion section configured to execute luminance tone compression on an entered image by use of a predetermined conversion curve, a linear matrix processing block configured to execute correction based on matrix operation on an image entered via the tone conversion section and a hue and saturation adjustment block configured to execute hue and saturation conversion processing based on a set parameter on an image entered via the linear matrix processing block. These method and program each have the steps of determining whether brightness of an image to be processed is lower than a certain brightness level and controlling a combination of the operations to be processed by the processing section and blocks on the basis of setting of a tone conversion function of the tone conversion section and a result of the decision.

In one embodiment of the invention, the setting of validity or invalidity of the tone conversion function, the setting of turning on/off of the linear matrix processing in accordance with the brightness of an image to be processed, and the setting of the hue and saturation adjustment parameters can be changed appropriately.

According to one embodiment of the invention, if tone compression processing is executed on an image in which there is a high luminance subject having high color purity in a low luminance subject, the color reproducibility of the image is not lowered, thereby generating naturally looking images.

BRIEF DESCRIPTION OF THE DRAWINGS

FIG. 9 is a block diagram illustrating an exemplary configuration of a general-purpose personal computer.

DETAILED DESCRIPTION OF THE PREFERRED EMBODIMENTS

This invention will be described in further detail by way of embodiments thereof with reference to the accompanying drawings.

Embodiments to be described later are specific examples having suitable forms for practicing the present invention, so that the following embodiments have various restrictions that are technically desirable. It should be noted that the present invention is not limited to these embodiments unless otherwise specified herein. Therefore, for example, the materials used and amounts thereof, processing time, processing sequence, and parameter numerical conditions are nothing but preferred examples and the dimensions, shapes and arrangement relations are approximate and illustrative only.

Figure 1:
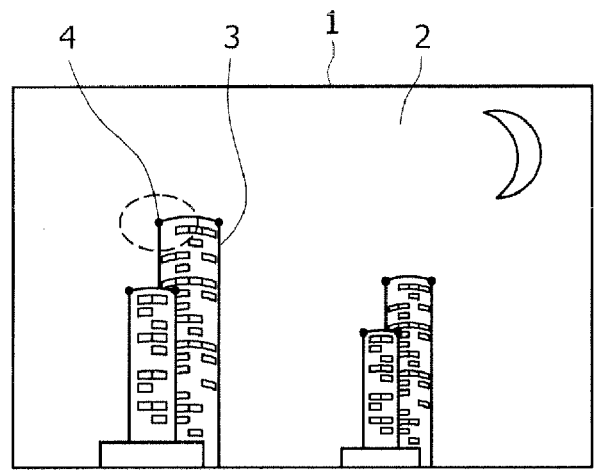
FIG. 1 is a schematic diagram illustrating an example of a night view image.
Figure 2:
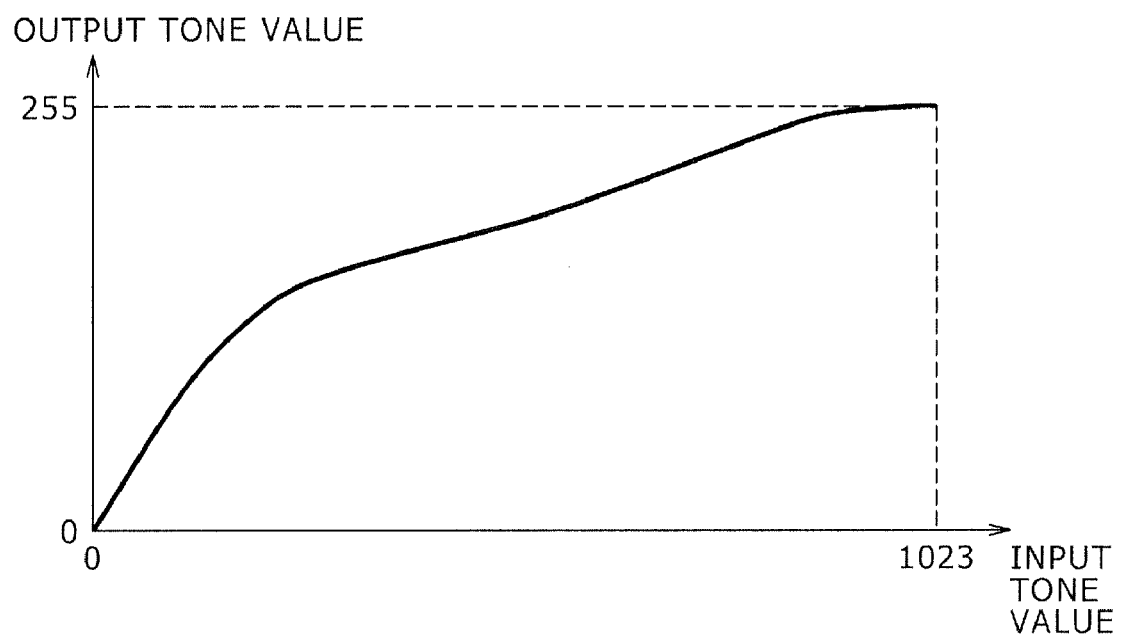
FIG. 2 is a graph indicative of an example of a tone curve.
Figure 3:
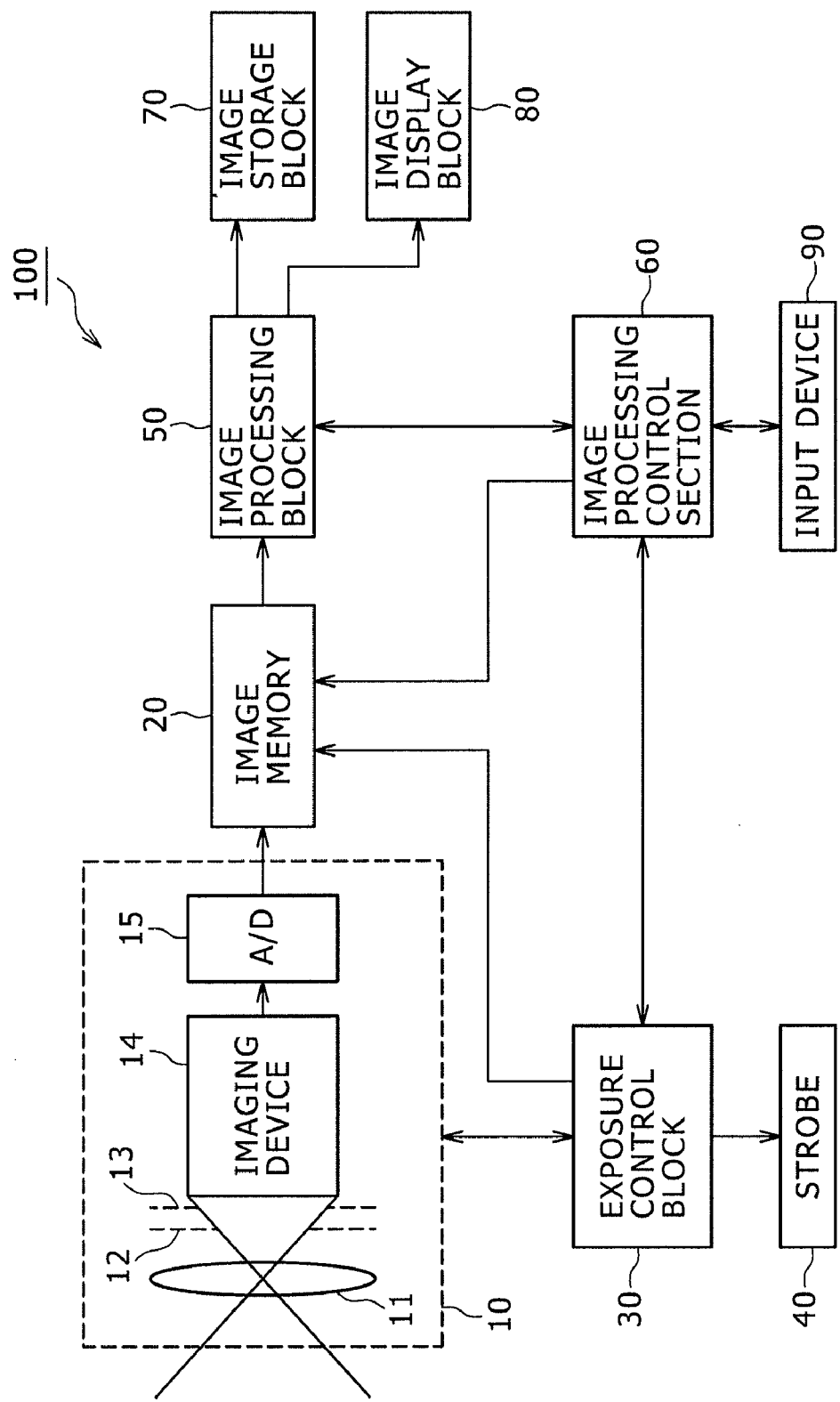
FIG. 3 is a block diagram illustrating an exemplary configuration of a digital still camera practiced as one embodiment of the invention.

Referring to FIG. 3, there is shown a block diagram illustrating an exemplary configuration of a digital still camera practiced as one embodiment of the invention.

A digital still camera 100 has a camera module 10, an image memory 20, an exposure control section 30, a strobe (flashing device) 40, an image processing block 50, an image processing control section 60, an image storage block 70, an image display block 80, and an input device 90.

The camera module 10 has a lens 11, an iris 12 for adjusting aperture, a shutter 13 for adjusting exposure time, an imaging device 14 such as a CCD (Charge Coupled Device) or CMOS (Complementary Metal Oxide Semiconductor), and an analog/digital (A/D) converter 15. The camera module 10 may be configurationally unitized with the digital still camera 100 or detachable therewith. It should be noted that the imaging block cited in the scope of claims hereto at least has the imaging device 14.

An incident light that has passed through an optical system composed of the lens 11, the iris 12 and the shutter 13 from a subject first reaches light-sensitive elements arranged on a surface of the imaging device 14 to be converted into an electric signal by photoelectric conversion. The electric signal outputted from the imaging device 14 is noise-cancelled by a correlation double sampling circuit, not shown, to be digitized by the A/D converter 15, the resultant digital signal being outputted from the camera module 10 as image data. In this process, each block of the camera module 10 is controlled by the exposure control section 30 such that the output of the imaging device 14 is optimized. The exposure control section 30 also controls the strobe 40 as needed.

The image data obtained by the photoelectric conversion through the imaging device 14 of the camera module 10 is temporarily stored in the image memory 20. In this process, luminance information, exposure setting information, and so on at the time of image taking may be obtained by the exposure control section 30 to be stored as related with each piece of image data as imaging information.

It should be noted that, because of a wide dynamic range of the imaging device 14, the imaging device 14 can image a subject from a dark part thereof to a bright part thereof without causing saturation and noise. Therefore, the A/D converter 15 converts the input electric signal into image data having the number of tones equal to that of ordinary digital still cameras (for example, the number of tones that can be expressed in data of about 10 to 12 bits) or higher (for example, the number of tones that can be expressed in data of about 14 to 16 bits).

Under the control of the image processing control section 60, the image processing block 50 executes demosaicing processing and tone compression processing on the image data stored in the image memory 20, thereby generating image data that can be stored and displayed. At this moment, the image processing block 50 executes the image processing to be described later on the image data such that the dynamic range of the image data reaches a level at which the image display block 80 can display the image data and then supplies the processed image data to the image storage block 70 or the image display block 80 as needed.

It should be noted that the image processing block 50 may be a block made up of a signal processor (for example, DSP (Digital Signal Processor)) and a memory such as RAM (Random Access Memory) for retaining image data, thereby executing the image processing to be described later with the processor executing predetermined programs.

The image processing control section 60 is a block made up of a processor such as CPU (Central Processing Unit) and a memory (not shown) for retaining data such as various settings and one example of a control block cited in the scope of claims hereto. This control block controls the digital still camera 100 in its entirety, such as analysis and brightness decision on the luminance information of the image data and various setting processing operations. For example, predetermined processing operations are executed in accordance with commands entered by the user through the input device 90 made up of operator buttons including a shutter button for example.

The image storage block 70 encodes the image data outputted from the image processing block 50 in a predetermined method such as JPEG (Joint Photographic Experts Group) or MPEG (Moving Picture Experts Group) and stores the encoded image data into a recording device designated as a storage destination. The designated storage destination may be a semiconductor memory such as a flash memory, a hard disk drive, a magnetic recording media, a magneto-optical recording media, or an optical recording media, for example.

The image display block 80 displays the image outputted from the image processing block 50 onto the screen of a display device based on LCD (Liquid Crystal Display), for example.

Figure 4:
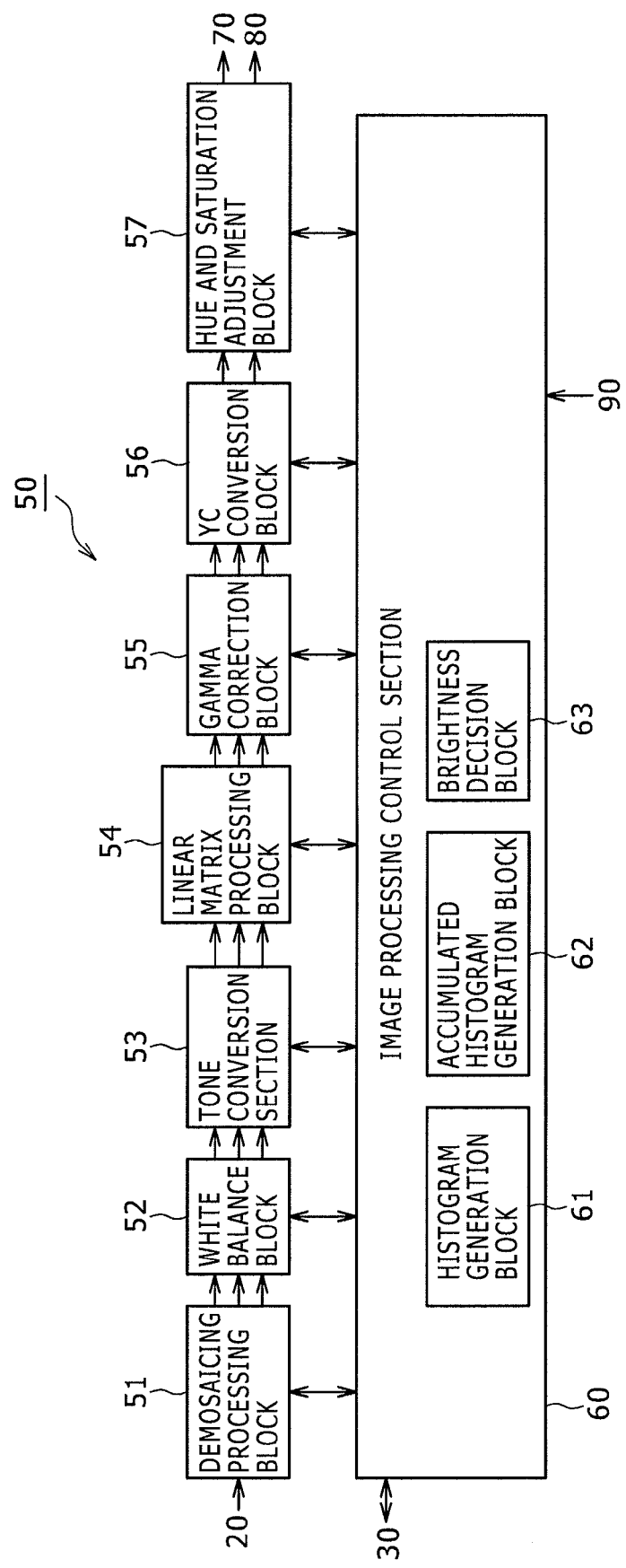
FIG. 4 is a block diagram illustrating an exemplary internal configuration of an image processing block shown in FIG. 3.

Referring to FIG. 4, there is shown a block diagram illustrating an exemplary internal configuration of the image processing block 50.

The image processing block 50 has a demosaicing processing block 51, a white balance block 52, a tone conversion section 53, a linear matrix processing block 54, a gamma correction block 55, a YC conversion block 56, and hue and saturation adjustment block 57.

The demosaicing processing block 51 obtains a mosaic image stored in the image memory 20 as A/D-converted by the A/D converter 15. The mosaic image is an image in which data corresponding to one of R, G, B color components is stored in one pixel and pixels thus obtained are arranged in accordance with a color matrix called Bayer matrix for example. The demosaicing processing block 51 executes demosaicing processing on the mosaic image such that one image has all the R, G, B components. Consequently, three items of image data, R image, G image, and B image corresponding to three color components R, G, B are generated.

The demosaicing processing block 51 supplies the generated three items of image data, R image, G image, and B image to the white balance block 52. It should be noted that, in what follows, the three items of image data, R image, G image, and B image, are also generically referred to as an RGB image.

The white balance block 52 adjusts the white balance of an RGB image such that the color balance of the achromatic part of a subject becomes actually achromatic by multiplying each pixel value of the RGB image by a proper coefficient. The white balance block 52 supplies the RGB image adjusted in white balance to the tone conversion section 53.

The tone conversion section 53 executes tone conversion processing on the white-balance adjusted RGB image by use of a tone curve (or a conversion curve) as disclosed in patent document 1, for example. The tone conversion section 53 supplies the tone-converted RGB image to the linear matrix processing block 54.

Alternatively, it is practicable to arrange a brightness decision block 53A between the tone conversion section 53 and the linear matrix processing block 54. Still alternatively, the image processing control section 60 may be provided with a function of determining brightness. The brightness decision processing will be detailed later.

The linear matrix processing block 54 executes linear matrix conversion on the tone-converted RGB image by use of a matrix coefficient that enhances color reproducibility. The linear matrix processing block 54 supplies the matrix-converted RGB image to the gamma correction block 55.

The gamma correction block 55 executes gamma correction on the matrix-converted RGB image. The gamma correction block 55 supplies the gamma-corrected RGB image to the YC conversion block 56.

The YC conversion block 56 is one example of a luminance & saturation image generation block cited in the scope of claims hereto. The YC conversion block 56 executes YC matrix processing and band limitation on the chroma component on the gamma-corrected RGB image to generate, from the RGB image, a Y image configured by the luminance component (Y component) and a C image (namely, a difference between RGB image and Y image) configured by color-difference component (Cb component or Cr component) The YC conversion block 56 supplies the generated Y image and C image to the hue and saturation adjustment block 57.

The hue and saturation adjustment block 57 executes hue and/or saturation adjustment processing on the Y image and the C image by multiplying the pixel value of each image by a proper gain coefficient. The hue and saturation adjustment block 57 supplies the Y image and the C image adjusted in hue and saturation to the image storage block 70 or the image display block 80 as needed.

The image processing control section 60 obtains exposure information from the exposure control section 30 as needed to control the operations of the blocks, demosaicing processing block 51 through hue and saturation adjustment block 57, and set parameters, for example.

The image processing control section 60 contains, as functions, a histogram generation block 61, an accumulated histogram generation block 62, and a brightness decision block 63.

The histogram generation block 61 generates a histogram that is the distribution information of luminance values of an image data (hereafter referred to as "taken image") taken by the camera module 10.

The accumulated histogram generation block 62 generates an accumulated histogram from the histogram of luminance values. The generated luminance histogram and luminance accumulated histogram are stored in the image memory 20 or a memory, not shown.

The brightness decision block 63 evaluates the brightness of an input image by determining whether or not the brightness of the input image satisfies certain conditions. For example, the brightness decision block 63 obtains the imaging information at the time of imaging processing and determines the brightness of the taken image data (taken image) on the basis of the obtained imaging information. The imaging information to be obtained includes the information about the brightness of the taken image. The information of brightness denotes "luminance distribution information" of a taken image used for exposure setting at image taking or "estimated subject luminance information" indicative of the estimated luminance of subject at the time of exposure setting. Computation of the estimated luminance of subject by the exposure control section 30 requires, as coefficients, the setting of aperture value at photometry, picture taking speed (or electronic shutter speed), and image sensor gain, in addition to the luminance distribution information (or photometry result) of an output image (or a taken image).

Figure 5A:
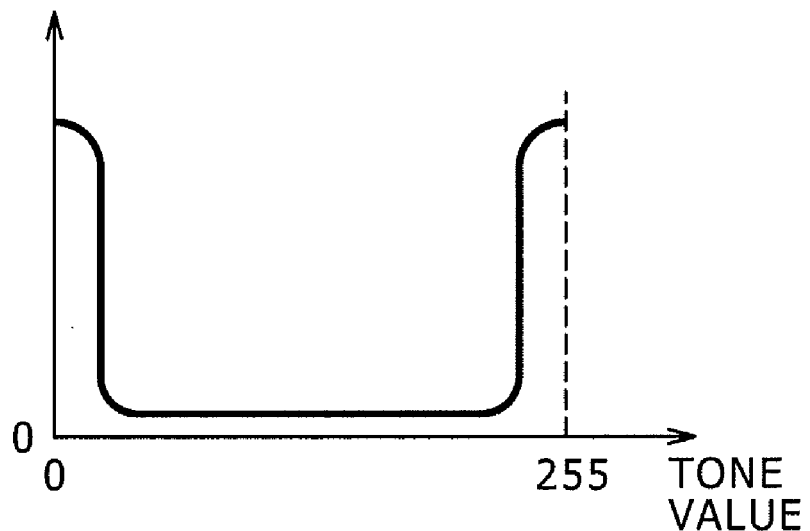
FIG. 5A is a graph indicative of a luminance histogram for describing an example of brightness information obtained by an exposure control section shown in FIG. 3.
Figure 5B:
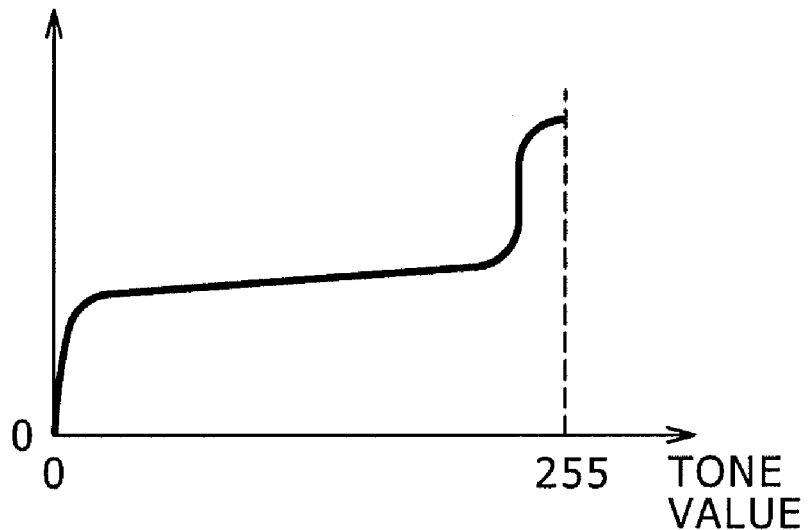
FIG. 5B is a graph indicative of a luminance accumulated histogram.

Referring to FIGS. 5A and 5B, there are shown graphs indicative of luminance distribution information as one example of brightness information. FIG. 5A shows a histogram of luminance, and FIG. 5B shows an accumulated histogram of luminance.

In FIG. 5A, the horizontal axis is representative of tone values corresponding to luminance and the vertical axis is representative of frequency for each tone. The frequency is high near tone value 0 and tone value 255 and low near intermediate tone values, thereby indicating that this particular image has many low luminance pixels and high luminance pixels and less intermediate luminance pixels. Further, in the case of this graph, a difference between the average level of luminance of image and the luminance of low luminance section and high luminance section is large, resulting in a large standard deviation.

On the other hand, FIG. 5B shows an accumulated histogram created from the histogram of luminance shown in FIG. 5A, in which the horizontal axis is representative of tone values corresponding to luminance and the vertical axis is representative of accumulated frequencies of the low luminance side, namely, from tone value 0 to other tone values. The increase ratio of the accumulated frequency near tone value 0 and tone value 255 is large and the increase ratio in intermediate tone values is almost zero, thereby indicating that this particular image contains many low luminance pixels and high luminance pixels and less intermediate luminance pixels.

Figure 6:
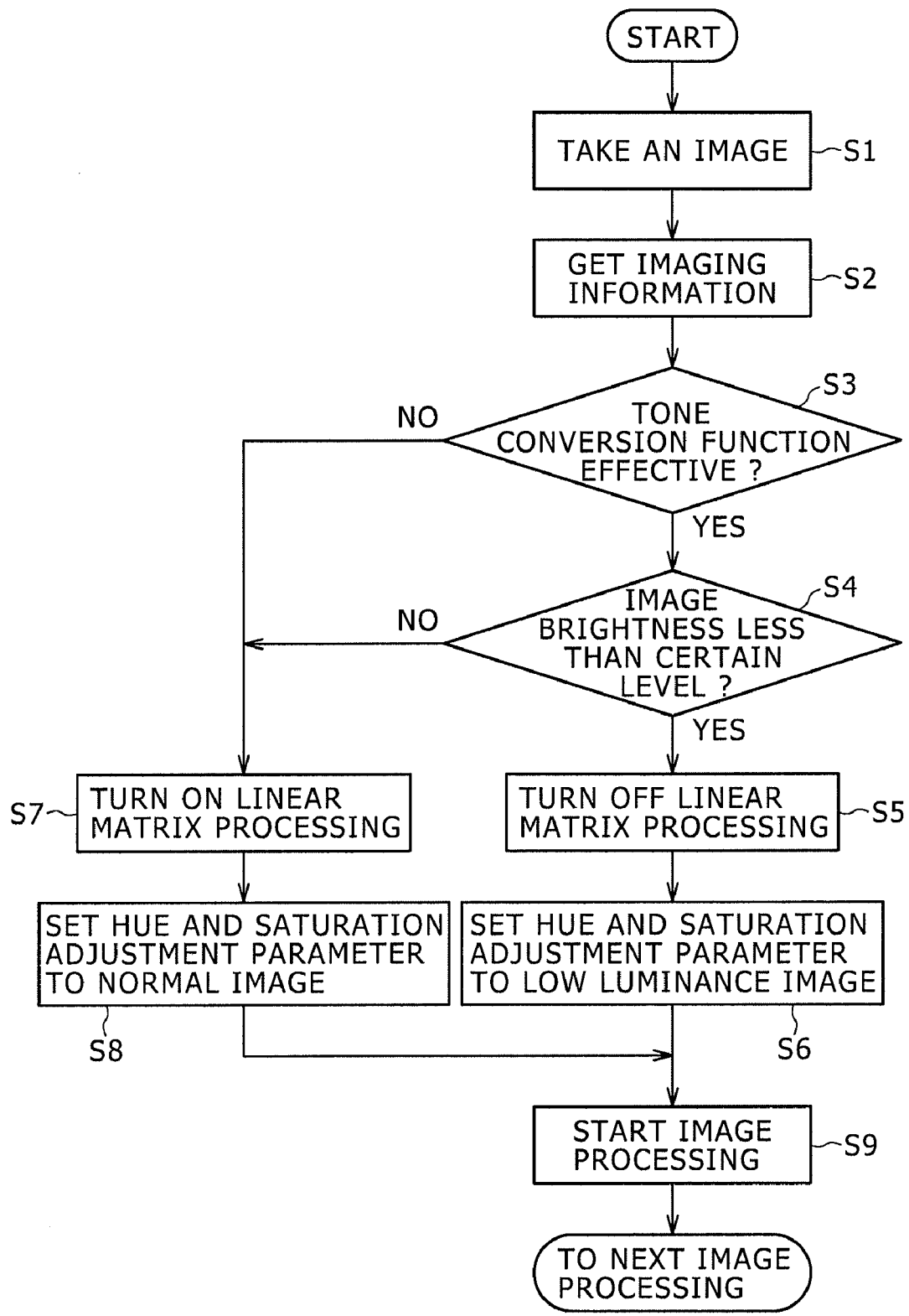
FIG. 6 is a flowchart indicative of image processing by the digital still camera shown in FIG. 3.

The following describes image processing to be executed by the digital still camera 100 with reference to a flowchart shown in FIG. 6. It should be noted that this processing starts when the user operates the input device 90 to start the image taking by the digital still camera 100.

First, in step S1, a subject is taken by the camera module 10 to generate image data of the subject by executing the above-mentioned predetermined processing. The exposure control at the time of image taking is executed by the exposure control section 30. The taken image data is stored in the image memory 20.

In step S2, the image processing control section 60 obtains the imaging information or the information about brightness of a taken image obtained at the time if imaging processing executed in step S1. Alternatively, the histogram generation block 61 or the accumulated histogram generation block 62 of the image processing control section 60 generates a luminance histogram or a luminance accumulated histogram of the taken image and stores the generated histogram in a memory, not shown, of the image processing control section 60.

In step S3, the image processing control section 60 determines whether a tone conversion function provided by the tone conversion section 53 is valid or not. Generally, the setting of the tone conversion function is determined by the setting by the user (not shown) through the input device 90 or by the setting previously held in the digital still camera 100. This information is eventually held in a register or a memory of the image processing control section 60. In this step, the image processing control section 60 determines whether or not the tone conversion function is valid or not on the basis the information held in the image processing control section 60.

If the tone conversion function of the tone conversion section 53 is found valid, then the procedure goes to step S4.

In step S4, the image processing control section 60 determines whether the image brightness information obtained in step S2 corresponds to a certain condition.

The above-mentioned certain condition denotes that a tone value indicative of an average value of the luminance of the pixels constituting image stored in the image memory 20 for example is lower than a predetermined threshold value or a subject luminance value (or estimated subject luminance information) determined by the exposure control section 30 at the time of image taking is lower than a predetermined threshold value. Another condition is that the standard deviation of an image luminance histogram is higher than a predetermined threshold value, the inclination of the intermediate luminance part of an image luminance accumulated histogram is lower than a predetermined threshold value, or, of the pixels constituting an image, those pixels of which pixel values are lower than a predetermined threshold value exist in the image with more than a predetermined ratio, for example. Further, a combination of these decision conditions may be used to determine whether the brightness of each image is lower than a certain brightness level. If the image brightness is found to be lower than a certain brightness level, the procedure goes to step S5.

In step S5, it is set for the linear matrix processing block 54 not to execute linear matrix processing on the image to be processed. Namely, it is set so as not to execute linear matrix processing in the linear matrix processing block 54, outputting the input image data directly to the gamma correction block 55.

Next, in step S6, the hue and saturation adjustment block 57 sets a correction parameter to be applied to the image to be processed to a predetermined low luminance image parameter determined to increase the gain of hue and saturation so as to compensate the color reproducibility lowered by the omission of linear matrix processing.

Let color difference components before the adjustment of hue and saturation be Cb, Cr and gain coefficients for low luminance image be G1, G2, G3, and G4, then color difference components Cb', Cr' after the adjustment of hue and saturation are expressed in the following equations, respectively:

$$Cb' = G1 \cdot Cb - G2 \cdot Cr \ldots \quad (1)$$

$$Cr' = G3 \cdot Cr - G4 \cdot Cb \ldots \quad (2)$$

Appropriately adjusting gains coefficients Gb, Gr of these equations (1) and (2) allows the adjustment of optimum hue and saturation in accordance with the brightness state of the image.

On the other hand, if the tone conversion function is found invalid in step S3 or if the brightness of image is found to be higher than a predetermined level in step S4, then it is set in step S7 that the linear matrix processing block 54 will execute linear matrix processing on the image to be processed in step S7.

In step S8, the hue and saturation adjustment block 57 sets a correction parameter (or a gain coefficient) to be applied to the image to be processed to a parameter other than for a predetermined low luminance image, a parameter for a normal image for example.

Upon completion of the above-mentioned setting processing operations, the image processing block 50 starts image processing in step S9.

For example, if the tone conversion function of the tone conversion section 53 is valid in step S3 and the image brightness is lower than a certain brightness level in step S4, then, the linear matrix processing is turned off and the hue and saturation adjustment parameter is set to for low luminance image in steps S5 and S6, respectively. After the completion of the setting, the image data is supplied from the image memory 20 to the image processing block 50 to be processed in the demosaicing processing block 51 and the white balance block 52 in a predetermined manner, the processed image data being supplied to the tone conversion section 53. The image data supplied to the tone conversion section 53 is tone-converted in a predetermined manner to be supplied to the linear matrix processing block 54. The image data supplied to the linear matrix processing block 54 is gamma-corrected by the gamma correction block 55 to be supplied to the YC conversion block 56 without being subjected to linear matrix process. In the YC conversion block 56, the image data of a luminance image and color difference components Cb, Cr is generated, the generated image data being supplied to the hue and saturation adjustment block 57.

The hue and saturation adjustment block 57 executes gain adjustment by multiplying each pixel value of the image data of color difference components Cb, Cr by a predetermined coefficient by use of the parameter for low luminance image. The image data thus processed is supplied to one or both of the image storage block 70 and the image display block 80 as needed to be stored and/or displayed.

On the other hand, if the tone conversion function of the tone conversion section 53 is invalid in step S3 or the image brightness is higher than a predetermined brightness level in step S4, then the linear matrix processing is turned on and the hue and saturation adjustment parameter is set for normal image in steps S7 and S8, respectively. Upon completion of the setting, the image data is supplied from the image memory 20 to the image processing block 50 to be processed by the demosaicing processing block 51 and the white balance block 52 in a predetermined manner, the processed image data being supplied to the tone conversion section 53. The image data supplied to the tone conversion section 53 is then supplied to the linear matrix processing block 54 without undergoing the tone conversion processing. The image data supplied to the linear matrix processing block 54 is linear-matrix processed to be supplied to the gamma correction block 55. The image data is gamma-corrected by the gamma correction block 55 to be supplied to the YC conversion block 56. In the YC conversion block 56, the image data of a luminance image and color difference components Cb, Cr is generated, the generated image data being supplied to the hue and saturation adjustment block 57.

The hue and saturation adjustment block 57 executes gain adjustment by multiplying each pixel value of the image data of color difference components Cb, Cr by a predetermined coefficient by use of the parameter for normal image. The image data thus processed is supplied to one or both of the image storage block 70 and the image display block 80 as needed to be stored and/or displayed.

As described above, the setting of validity or invalidity of the tone conversion function, the setting of turning on/off of the linear matrix processing in accordance with the brightness of an image to be processed, and the setting of the hue and saturation adjustment parameters can be changed appropriately.

Consequently, if tone compression processing is executed on an image in which there is a high luminance subject having high color purity (an airway beacon for example) in a low luminance subject (a night sky for example), the color reproducibility of the image is not lowered because no linear matrix processing has been executed on the image. At the same time, luminance inversion between the low luminance section and the high luminance section can be prevented, thereby preventing the generation of unnatural images to produce naturally looking ones.

It should be noted that the above-mentioned processing sequence in the above-mentioned flowcharts is one example; therefore, the processes in the above-mentioned flowcharts may be replaced by each other or two or more processes may be executed at the same time without departing from the gist of the present invention.

It should also be noted that the functions of the histogram generation block 61 and the accumulated histogram generation block 62 of the image processing control section 60 are not limited to the above-mentioned embodiments; it is also practicable that the digital still camera 100 or the exposure control section 30 may have these functions.

Figure 7:
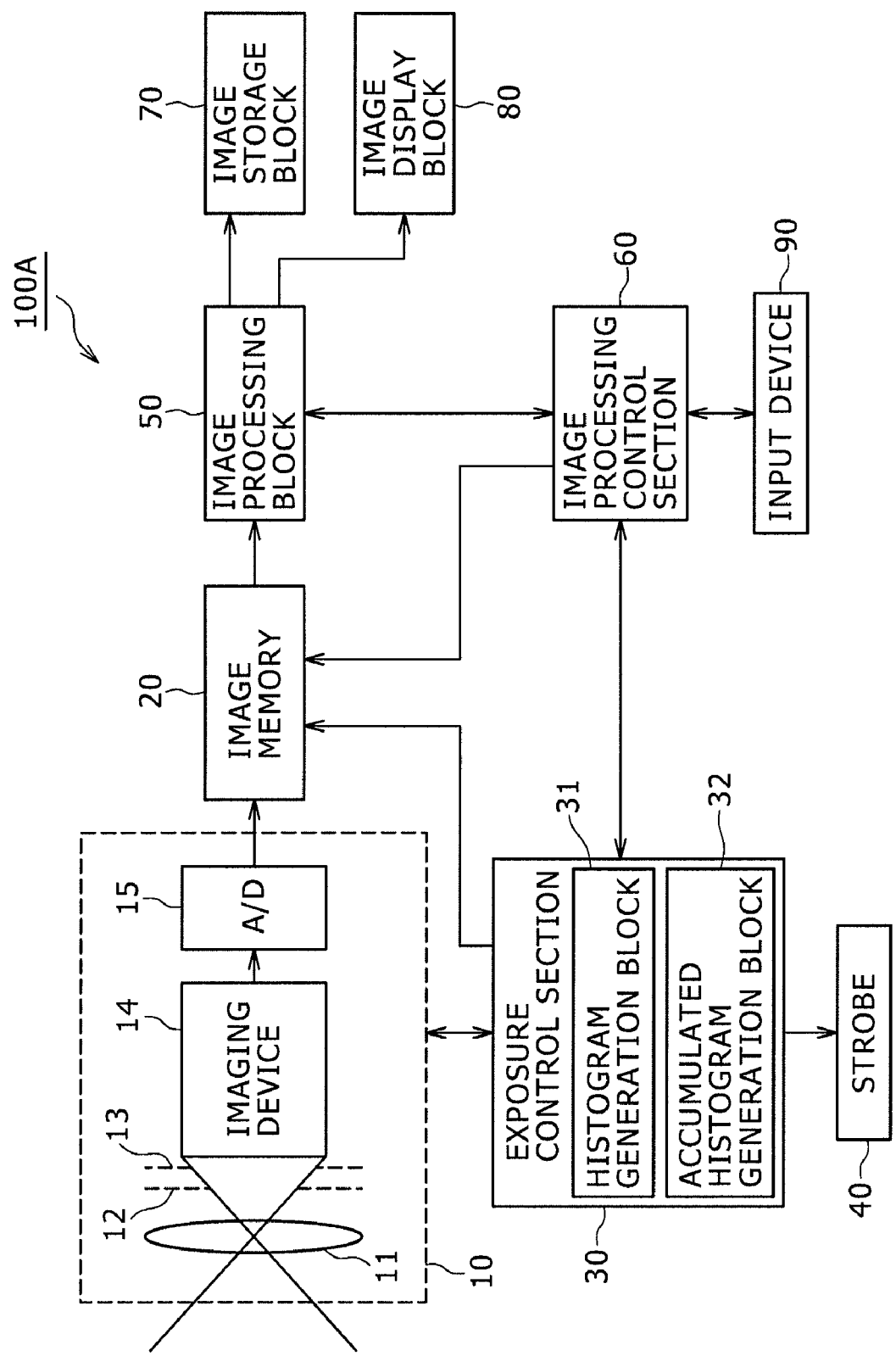
FIG. 7 is a block diagram illustrating another exemplary internal configuration of a digital still camera practiced as one embodiment of the invention.

Referring to FIG. 7, there is shown a block diagram illustrating an exemplary configuration of a digital still camera practiced as another embodiment of the invention.

For example, the image processing control section 60 may determine the distribution condition of the number of pixels on the low luminance side in each image by use of, as brightness information, the standard deviation of a taken-image luminance histogram generated by a histogram generation block 31 of an exposure control section 30 or an accumulated histogram generated from this luminance histogram by an accumulated histogram generation block 32 of the exposure control section 30.

In this example, the image processing control section 60 obtains this brightness information from the exposure control section 30; however, if image taking information was stored in an image memory 20 at the storage of an taken image into the image memory 20 by the exposure control section 30, for example, the image taking information may be obtained from the image memory 20.

Figure 8:
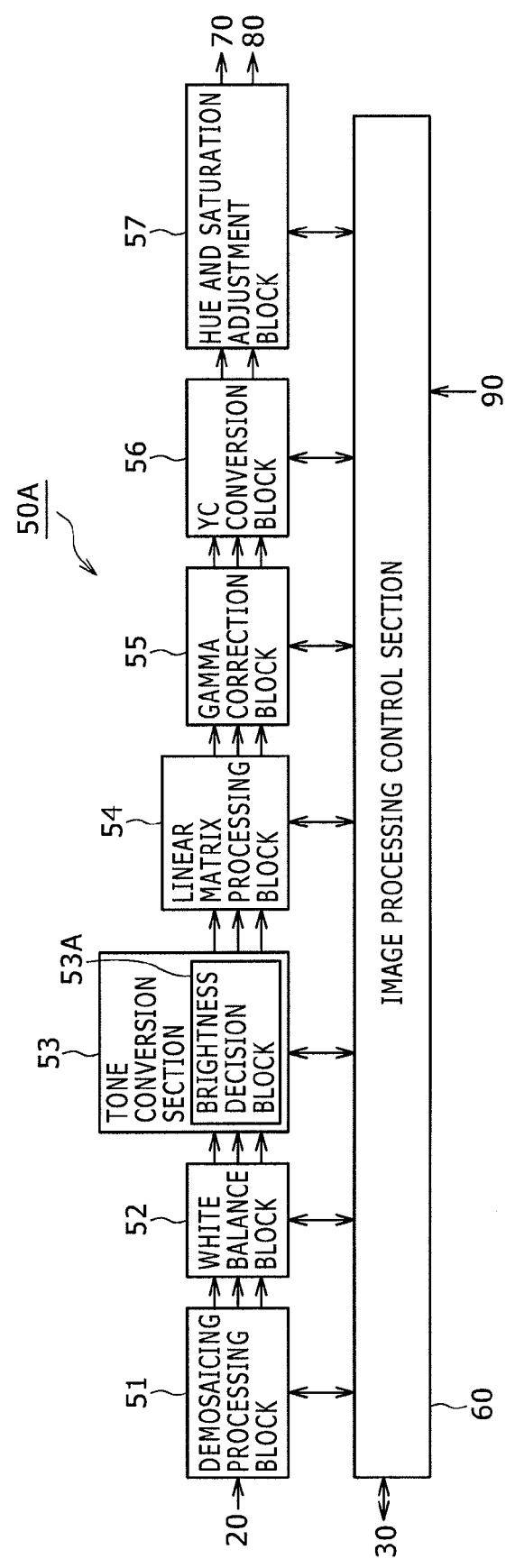
FIG. 8 is a block diagram illustrating an exemplary internal configuration of an image processing block shown in FIG. 7.

Referring to FIG. 8, there is shown a block diagram illustrating an exemplary internal configuration of an image processing block practiced as another embodiment. As shown, the image brightness determining function, or a brightness decision block, may be arranged on an image conversion block 53.

As shown in this example, if a tone conversion section 53 has a brightness decision block 53A for determining the brightness of an image, brightness decision may be executed after the completion of tone conversion processing on the taken-image luminance tone in the tone conversion section 53 and by getting the information of the brightness of the image on which tone conversion processing was executed.

It should be noted that the present invention is applicable to apparatuses (an image generating apparatus, an image recording apparatus, and image display apparatus, for example) for compressing the tone of luminance or color value (or pixel value) of image, in addition to the above-mentioned digital still camera.

The above-mentioned sequence of processing operations may be executed by software as well as hardware. Obviously, the functions for executing these processing operations can be realized by the combination of hardware and software. When the above-mentioned sequence of processing operations is executed by software, the programs constituting the software are installed in a computer which is built in dedicated hardware equipment or installed, from a network or recording media, into a general-purpose personal computer for example in which various programs may be installed for the execution of various functions Referring to FIG. 9, there is shown a block diagram illustrating an exemplary configuration of a computer configured to execute the above-mentioned sequence of processing operations by means of software programs. A computer 101 may be a high-performance computer dedicated to the execution of the above-mentioned sequence of processing operations or a personal computer having a certain performance level.

A CPU (Central Processing Unit) 111 of the computer 101 executes various processing operations in addition to the above-mentioned sequence of processing operations as instructed by programs recorded to a ROM (Read Only Memory) 112 or a recording block 118. A RAM (Random Access Memory) 113 stores programs to be executed by the CPU 111 and data used for the execution. These CPU 111, ROM 112, and RAM 113 are interconnected by a bus 114.

The CPU 111 is also connected with an input/output interface 115 via the bus 114. The input/output interface 115 is connected with an input block 116 based on keyboard, mouse, and microphone, for example and an output block 117 based on a display monitor and a loudspeaker, for example. The CPU 111 executes various processing operations in accordance with commands entered from the input block 116. Then, the CPU 111 outputs processing results to the output block 117.

The recording block 118 connected to the input/output interface 115, based on a hard disk drive for example, records programs to be executed by the CPU 111 and various data.

A communication block 119 communicates with external devices via a network, such as the Internet or a local area network. Also, programs can be obtained via the communication block 119 to be recorded to the recording block 118.

A drive 120 connected to the input/output interface 115 drives a removable media 131, such as a magnetic disk, an optical disk, a magneto-optical disk, or a semiconductor memory, when the removable media 131 is loaded on the drive 120, thereby getting programs and data from the loaded removable media. The obtained programs and data are transferred to the recording block 118 to be recorded as needed.

As shown in FIG. 9, program recording media for storing programs that are installed on a computer for execution is made up of the removable media 131 that are package media made up of a magnetic disc (including a flexible disc), an optical disc (including CD-ROM (Compact Disc-Read Only Memory), a DVD (Digital Versatile Disc), a magneto-optical disc, or a semiconductor memory, the ROM 112 in which programs are temporarily or permanently stored (recorded), or a hard disc drive that forms the recording block 118.

Storing of programs into program recording media is executed by use of wired or wireless communication media, such as a LAN (Local Area Network), the Internet, or digital satellite broadcasting, via the communication block 119 that provides an interface, such as a router and a modem, as needed.

It should be noted herein that the steps for describing each program recorded in recording media include not only the processing operations which are sequentially executed in a time-dependent manner but also the processing operations which are executed concurrently or discretely (concurrent processing or object-oriented processing).

It should also be noted that each program may be processed by one computer or by two or more computers in a distributed manner. In addition, each program may be transferred to a remote computer for execution.

While preferred embodiments of the present invention have been described using specific terms, such description is for illustrative purpose only, and it is to be understood that changes and variations may be made without departing from the spirit or scope of the following claims.

What is claimed is:

1. An image processing apparatus comprising:
a tone conversion section configured to execute luminance tone compression on an entered image by use of a predetermined conversion curve;
a linear matrix processing block configured to execute correction based on matrix operation on an image entered via said tone conversion section;
a hue and saturation adjustment block configured to execute hue and saturation conversion processing based on a set parameter on an image entered via said linear matrix processing block;
a brightness decision block configured to determine whether brightness of the image to be processed is lower than a certain brightness level; and
a control block configured to control a combination of the operations to be processed by the processing section and blocks on the basis of setting of a tone conversion function of said tone conversion section and a decision result obtained by said brightness decision block.

2. The image processing apparatus according to claim 1, further comprising:
a luminance and color difference image generation block configured to generate a luminance image and each color difference image from each color component of the image entered via said linear matrix processing block,
wherein said hue and saturation adjustment block applies a parameter based on a decision result obtained by said brightness decision block to each pixel of said luminance image and said color difference image.

3. The image processing apparatus according to claim 2, wherein, if a tone conversion function of said tone conversion section is valid and brightness of the image to be processed is determined to be lower than a certain brightness level,
said control block turns off linear matrix processing by said linear matrix processing block and sets the parameter of said hue and saturation adjustment block to that for a low luminance image.

4. The image processing apparatus according to claim 3, wherein said brightness decision block determines brightness of said image to be processed by making comparison between an average value of luminance tones of pixels constituting said image to be processed and a predetermined threshold value.

5. The image processing apparatus according to claim 3, further comprising:
a histogram generation block configured to generate luminance distribution information of pixels constituting said image to be processed,
wherein said brightness decision block determines brightness of said image to be processed by making comparison between a standard deviation of said luminance distribution information and a predetermined threshold value.

6. The image processing apparatus according to claim 3, further comprising:
an accumulated histogram generation block configured to generate an accumulated histogram of luminance of pixels constituting said image to be processed,
wherein said brightness decision block determines brightness of said image to be processed by making comparison between an accumulated frequency in a predetermined tone of said accumulated histogram and a predetermined threshold value.

7. The image processing apparatus according to claim 1, wherein,
if one of two conditions that a tone conversion function of said tone conversion section is invalid and brightness of said image to be processed is found by said brightness decision block to be not lower than a certain brightness level is provided,
said control block turns on linear matrix processing of said linear matrix processing block and sets the parameter of said hue and saturation adjustment block to one that is not for a low luminance image.

8. An imaging apparatus comprising:
an imaging block configured to take a picture of a subject to generate an image;
a tone conversion section configured to execute luminance tone compression on the image generated by said imaging block by use of a predetermined conversion curve;
a linear matrix processing block configured to execute correction based on matrix operation on an image entered via said tone conversion section;
a hue and saturation adjustment block configured to execute hue and saturation conversion processing based on a set parameter on an image entered via said linear matrix processing block;
a brightness decision block configured to determine whether brightness of the image to be processed is lower than a certain brightness level; and
a control block configured to control a combination of the operations to be processed by the processing section and blocks on the basis of setting of a tone conversion function of said tone conversion section and a decision result obtained by said brightness decision block.

9. An image processing method that is executed by an image processing apparatus having a tone conversion section configured to execute luminance tone compression on an entered image by use of a predetermined conversion curve, a linear matrix processing block configured to execute correction based on matrix operation on an image entered via said tone conversion section and a hue and saturation adjustment block configured to execute hue and saturation conversion processing based on a set parameter on an image entered via said linear matrix processing block, comprising the steps of:
determining whether brightness of an image to be processed is lower than a certain brightness level; and
controlling a combination of the operations to be processed by the processing section and blocks on the basis of setting of a tone conversion function of said tone conversion section and a result of the determining decision.

10. A program stored on a non-transitory computer readable medium for image processing by an image processing apparatus having a tone conversion section configured to execute luminance tone compression on an entered image by use of a predetermined conversion curve, a linear matrix processing block configured to execute correction based on matrix operation on an image entered via said tone conversion section and a hue and saturation adjustment block configured to execute hue and saturation conversion processing based on a set parameter on an image entered via said linear matrix processing block, said program making a computer execute the image processing comprising the steps of:
determining whether brightness of an image to be processed is lower than a certain brightness level; and
controlling a combination of the operations to be processed by the processing section and blocks on the basis of setting of a tone conversion function of said tone conversion section and a result of the determining decision.

11. An image processing apparatus comprising:
- tone conversion means for executing luminance tone compression on an entered image by use of a predetermined conversion curve;
- linear matrix processing means for executing correction based on matrix operation on an image entered via said tone conversion means;
- hue and saturation adjustment means for executing hue and saturation conversion processing based on a set parameter on an image entered via said linear matrix processing means;
- brightness decision means for determining whether brightness of the image to be processed is lower than a certain brightness level; and
- control means for controlling a combination of the operations to be processed by the processing means on the basis of setting of a tone conversion function of said tone conversion means and a decision result obtained by said brightness decision means.

12. An imaging apparatus comprising:
- imaging means for taking a picture of a subject to generate an image;
- tone conversion means for executing luminance tone compression on the image generated by said imaging means by use of a predetermined conversion curve;
- linear matrix processing means for executing correction based on matrix operation on an image entered via said tone conversion means;
- hue and saturation adjustment means for executing hue and saturation conversion processing based on a set parameter on an image entered via said linear matrix processing means;
- brightness decision means for determining whether brightness of the image to be processed is lower than a certain brightness level; and
- control means for controlling a combination of the operations to be processed by the processing means on the basis of setting of a tone conversion function of said tone conversion means and a decision result obtained by said brightness decision means.

* * * * *